United States Patent
Zhao et al.

(10) Patent No.: US 10,404,391 B2
(45) Date of Patent: Sep. 3, 2019

(54) WIRELESS COMMUNICATION DEVICE AND WIRELESS COMMUNICATION METHOD

(71) Applicant: KDDI CORPORATION, Tokyo (JP)

(72) Inventors: Bingxuan Zhao, Tokyo (JP); Katsuo Yunoki, Tokyo (JP)

(73) Assignee: KDDI CORPORATION, Tokyo (JP)

( * ) Notice: Subject to any disclaimer, the term of this patent is extended or adjusted under 35 U.S.C. 154(b) by 0 days.

(21) Appl. No.: 15/540,642

(22) PCT Filed: Dec. 25, 2015

(86) PCT No.: PCT/JP2015/086185
§ 371 (c)(1),
(2) Date: Jun. 29, 2017

(87) PCT Pub. No.: WO2016/111194
PCT Pub. Date: Jul. 14, 2016

(65) Prior Publication Data
US 2018/0006751 A1 Jan. 4, 2018

(30) Foreign Application Priority Data
Jan. 6, 2015 (JP) ................................. 2015-000722

(51) Int. Cl.
*H04J 1/02* (2006.01)
*H04L 27/26* (2006.01)
(Continued)

(52) U.S. Cl.
CPC ................ *H04J 1/02* (2013.01); *H04J 11/00* (2013.01); *H04L 1/0008* (2013.01); *H04L 1/06* (2013.01);
(Continued)

(58) Field of Classification Search
None
See application file for complete search history.

(56) References Cited

U.S. PATENT DOCUMENTS 6,005,840 A * 12/1999 Awater ................ H04L 27/2628
370/206
8,400,968 B2 3/2013 Liu et al.
(Continued)

FOREIGN PATENT DOCUMENTS

| CN | 101933262 A | 12/2010 |
|---|---|---|
| JP | 2013-514010 | 4/2013 |

(Continued)

OTHER PUBLICATIONS

Japanese Office Action issued for Japanese Application No. 2015-000722 dated May 22, 2018 along with the English translation thereof.
(Continued)

*Primary Examiner* — Steve R Young
(74) *Attorney, Agent, or Firm* — Greenblum & Bernstein, P.L.C.

(57) ABSTRACT

A wireless communication device transmits data to multiple wireless terminals at the same timing. The wireless communication device includes a complement calculation part configured to calculate the amount of complement for transmission data for each wireless terminal among multiple wireless terminals on multiple subcarriers distributed and assigned thereto, a complementation part configured to complement transmission data using the amount of complement calculated for each wireless terminal, and a transmitter configured to transmit the complemented transmission data to multiple wireless terminals via multiple subcarriers. The wireless communication device further includes a frame generator configured to generate frames (e.g. OFDMA frames) used to multiplex and transmit the complemented (Continued)

transmission data to multiple wireless terminals. The complement calculation part calculates the amount of complement based on the number of available subcarriers, which is determined via carrier sensing.

8 Claims, 6 Drawing Sheets

(51) Int. Cl.
    *H04L 5/00* (2006.01)
    *H04W 28/06* (2009.01)
    *H04J 11/00* (2006.01)
    *H04W 84/12* (2009.01)
    *H04W 72/04* (2009.01)
    *H04W 74/08* (2009.01)
    *H04L 1/06* (2006.01)
    *H04L 1/00* (2006.01)
    *H04L 27/00* (2006.01)

(52) U.S. Cl.
    CPC .......... *H04L 5/003* (2013.01); *H04L 27/0006* (2013.01); *H04L 27/2626* (2013.01); *H04W 28/06* (2013.01); *H04W 72/0453* (2013.01); *H04W 74/0808* (2013.01); *H04W 84/12* (2013.01); *H04L 1/0001* (2013.01); *H04L 5/0037* (2013.01); *H04W 72/0406* (2013.01)

(56) References Cited

U.S. PATENT DOCUMENTS

| | | | | |
|---|---|---|---|---|
| 8,649,450 | B2* | 2/2014 | Hou-Shin | H04L 5/0053 375/260 |
| 9,166,858 | B2* | 10/2015 | Dandach | H04L 27/2631 |
| 2004/0058701 | A1* | 3/2004 | Jung | H04L 27/2617 455/522 |
| 2008/0165672 | A1* | 7/2008 | Ku | H04L 1/0643 370/208 |
| 2009/0257454 | A1* | 10/2009 | Maltsev | H04L 1/0071 370/480 |
| 2011/0131464 | A1* | 6/2011 | Ko | H04L 1/0041 714/752 |
| 2011/0134816 | A1* | 6/2011 | Liu | H04L 1/06 370/310 |
| 2011/0188518 | A1* | 8/2011 | Kenney | H04L 1/0041 370/476 |
| 2014/0376504 | A1 | 12/2014 | Morioka et al. | |

FOREIGN PATENT DOCUMENTS

| | | |
|---|---|---|
| JP | 2014-192607 | 10/2014 |
| WO | 2011/072164 | 6/2011 |

OTHER PUBLICATIONS

Yasuhiko Inoue et al., "A Study on a Group Management Scheme for Multi-User Transmissions over WLANs", Proceedings of the 2013 IEICE General Conference Communications 1, Mar. 5, 2013, p. 622, along with the English translation thereof.

IEEE P802.11ac./D4.0, Nov. 21, 2012, pp. 115-116.

Search Report issued in International Patent Application No. PCT/JP2015/086185, dated Mar. 1, 2016, with an English translation.

Chinese Office Action issued for Chinese Patent Application No. 201580072346.5 dated Apr. 26, 2018 with partial English translation.

Extended European Search Report issued for European Application No. 15877067.7 dated Aug. 13, 2018.

* cited by examiner

WIRELESS COMMUNICATION DEVICE AND WIRELESS COMMUNICATION METHOD

TECHNICAL FIELD

The present invention relates to a wireless communication device and a wireless communication method for a wireless LAN communication system.

The present application claims the benefit of priority on Japanese Patent Application No. 2015-722 filed on Jan. 6, 2015, the subject matter of which is hereby incorporated herein by reference.

BACKGROUND ART

Conventionally, technologies that allow user terminals such as mobile phone terminals to carry out data communications during movement (i.e. mobile wireless data communication technologies) have been developed, and therefore technological innovation for various wireless communication systems have been made for practical use. Recently, the fourth-generation communication standards for high-speed data communications, e.g. LTE (Long Term Evolution) system and WiMAX (Worldwide Interoperability for Microwave Access) system using OFDMA (Orthogonal Frequency Division Multiple Access) technology, have become prevalent as mainstream technologies.

In addition, communication procedures using CSMA/CA (Carrier Sense Multiple Access with Collision Avoidance) mechanism, wireless LAN communication system, have been developed as the basis for communications between base stations and information terminals such as PC (Personal Computer). Then, the IEEE802.11 Working Group, which has developed wireless LAN communication standards, starts to study how to apply OFDMA technology to the current wireless LAN communication system with CSMA/CA mechanism in order to achieve more-efficient data communications.

TDD (Time Division Duplex) type OFDMA system such as WiMAX will be a reference as to apply OFDMA technology to wireless LAN. It transmits and receives data at different timings on the same frequency channel. The WiMAX system may operate under environments without other wireless communication systems causing radio interference in the frequency band of which only the WiMAX system is operated by a single common carrier. According to the basic frame configuration of WiMAX, downlink data frames for transmitting data in directions from base stations to wireless terminals and uplink data frames for transmitting data in directions from wireless terminals to base stations are used for transmission and reception using certain frame lengths, certain numbers of sub-channels, and certain transmission periods.

CITATION LIST

Patent Literature

Patent Literature 1: U.S. Pat. No. 8,400,968

SUMMARY OF INVENTION

Technical Problem

Wireless LAN systems using access procedures for CAMA/CA may be dynamically varied in available wireless bandwidths; hence, they may have features that time lengths of transmission frames tend to be varied depending on data sizes and modulation rates of wireless communications. For this reason, it is necessary to complement data lengths so as to appropriately configure OFDMA frames in consideration of dynamic variations in the number of subcarriers used for OFDMA multiplexing, sizes of data transmitted to wireless terminals, and modulation rates used for wireless communications.

The technology disclosed in Patent Literature 1, which is applied to IEEE802.11ac standards for wireless LAN system, provides a method for adjusting frame lengths when concurrently transmitting data destined to multiple wireless terminals via special multiplexing. As shown in FIG. 4, Patent Literature 1 uses data complementation in a physical layer (PHY PAD) together with data complementation in a MAC (Media Access Control) layer (MAC Padding). For this reason, the technology of Patent Literature 1 suffers from low communication efficiency.

The present invention is made in consideration of the aforementioned circumstances, and therefore the present invention aims to provide a wireless communication device and a wireless communication method so as to efficiently complement data when transmitting data to multiple wireless terminals.

Solution to Problem

A first aspect of the present invention is directed to a wireless communication device that is able to transmit data to multiple wireless terminals at the same timing. The wireless communication device includes a complement calculation part configured to calculate the amount of complement for transmission data for each wireless terminal among multiple wireless terminals on multiple subcarriers distributed and assigned thereto; a complementation part configured to complement transmission data using the complement calculated for each wireless terminal; and a transmitter configured to transmit the complemented transmission data to multiple wireless terminals by using multiple subcarriers.

In the above, the wireless communication device may further includes a frame generator configured to generate a frame used to multiplex and transmit the complemented transmission data to multiple wireless terminals. In addition, the complementation part may complement transmission data using a bit string (EOF) representing the end of a frame. The frame generator may use a MAC frame, a concatenated MAC frame, or both of these frames. The complement calculation part may calculate the amount of complement for transmission data based on at least one of the number of available subcarriers, the size of transmission data for each wireless terminal, a modulation rate and a coding rate of transmission data. The wireless communication device may further include a controller configured to determine the number of available subcarriers by carrying out carrier sensing. The frame generator may generate an OFDMA frame. The above wireless communication device may serve as an access point of a wireless LAN system.

A second aspect of the present invention is directed to a wireless communication method for transmitting data to multiple wireless terminals at the same timing. The wireless communication method includes a step of calculating the amount of complement for transmission data for each wireless terminal among multiple wireless terminals on multiple subcarriers distributed and assigned thereto; a step of complementing transmission data using the complement calculated for each wireless terminal; and a step of transmitting the complemented transmission data to multiple wireless terminals by using multiple subcarriers at the same timing.

A third aspect of the present invention is directed to a storage medium storing a program causing a computer to execute the aforementioned wireless communication method.

Advantageous Effects of Invention

According to the present invention, it is possible to efficiently complement data when a wireless LAN system adopting the OFDMA system transmits data (e.g. OFDMA frames) to multiple wireless terminals on multiple subcarriers.

DESCRIPTION OF EMBODIMENT

Figure 1:
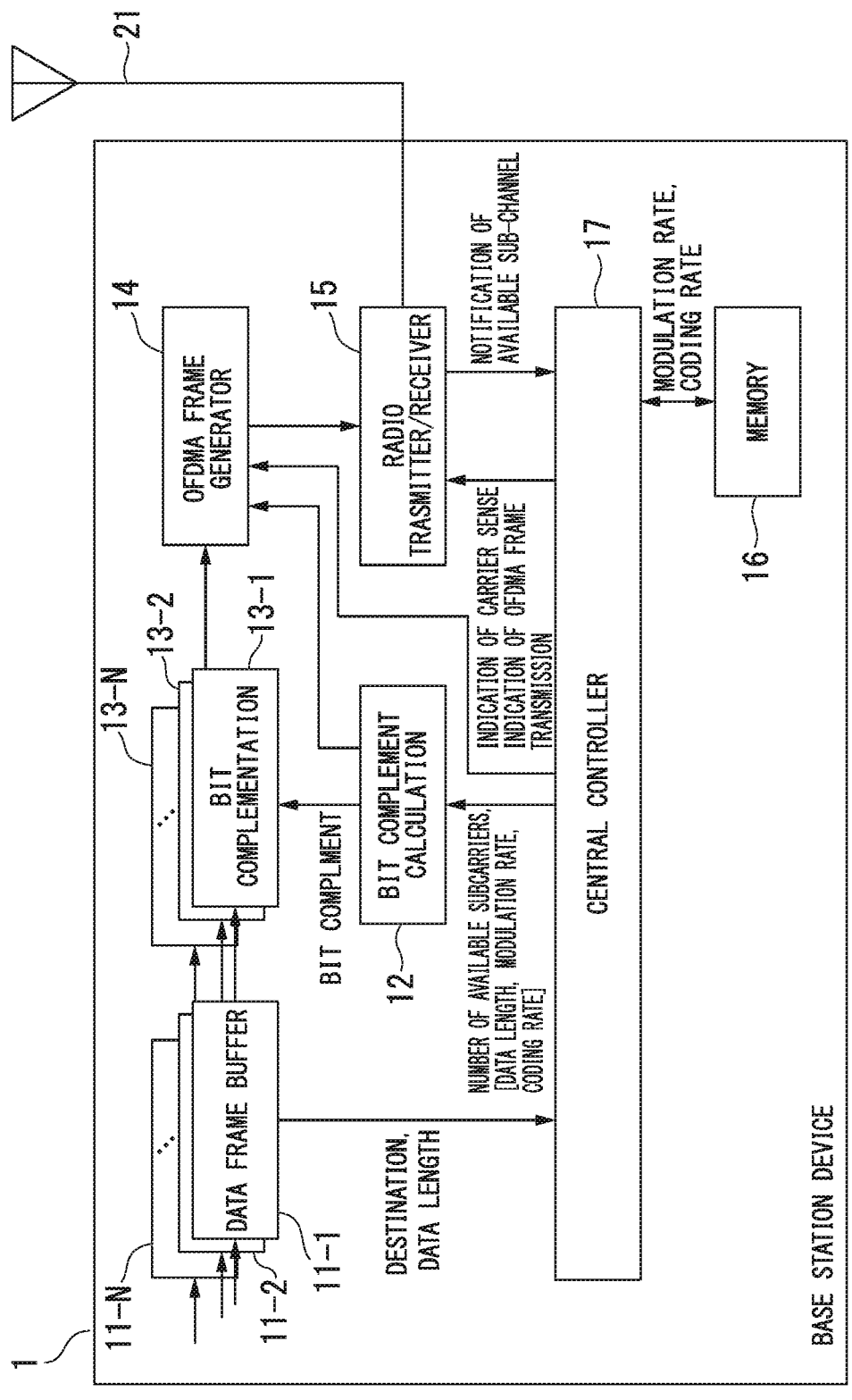
FIG. 1 is a block diagram showing the configuration of a base station device according to one embodiment of the present invention.

FIG. 1 is a block diagram showing the configuration of a base station device 1 according to one embodiment of the present invention. The base station device 1 is an access point (AP) for a wireless LAN system. The base station device 1 may communicate data (e.g. user data) among multiple wireless terminals (not show). The base station device 1 is able to concurrently transmit data, multiplexed via OFDMA, to multiple wireless terminals.

The base station device 1 includes multiple data frame buffers 11 (i.e. 11-1 through 11-N, where N is an integer equal to or greater than two), a bit complement calculation part 12, multiple bit complementation parts 13 (i.e. 13-1 through 13-N), an OFDMA frame generator 14, a radio transmitter/receiver 15, a memory unit 16, a central controller (or a CPU) 17, and an antenna 21. In this connection, the base station device 1 includes other constituent elements required for a wireless LAN system, but their detailed descriptions will be omitted here.

The present embodiment includes the same number (i.e. the number N) of the data frame buffers 11 and the bit complementation parts 13, which are aligned in one-to-one correspondence. That is, a pair of the data frame buffer 11 and the bit complementation part 13 corresponds to a single wireless terminal. In other words, the base station device 1 is able to correspond with maximally N wireless terminals by way of N pairs of data frame buffers 11 and bit complementation parts 13.

The data frame buffer 11 temporarily holds data to be transmitted to a wireless terminal. The bit complement calculation part 12 calculates a data complement for data to be transmitted to a wireless terminal. The present embodiment uses a bit complement as a data complement. The bit complementation part 13 complements transmission data, temporarily held by the data frame buffer 11, by a bit complement calculated by the bit complement calculation part 12.

The OFDMA frame generator 14 generates an OFDMA frame using transmission data complemented by the bit complementation part 13. The OFDMA fame may include transmission data towards multiple wireless terminals.

The radio transmitter/receiver 15 modulates OFDMA frames, generated by the OFDMA frame generator 14, to radio frequency so as to transmit them via the antenna 21. In addition, the radio transmitter/receiver 15 receives ambient radio waves via the antenna 21 so as to identify available radio sub-channels. In the present embodiment, concrete methods and criteria for identifying available radio sub-channels may conform to methods and criteria determined for the wireless communication system used in the base station device 1.

The antenna 21 converts electric signals (i.e. high-frequency signals subjected to transmission), input from the radio transmitter/receiver 15, into radio waves so as to transmit them to the air. In addition, the antenna 21 converts the received radio waves into electric signals (i.e. high-frequency signals) so as to send them to the radio transmitter/receiver 15.

The memory unit 16 includes a storage unit configured to store various pieces of information. In this connection, the memory unit 16 may include a storage unit configured to temporarily store information or a storage unit configured to store information non-temporarily.

The central controller 17 controls various processes executed by the base station device 1.

Figure 2:
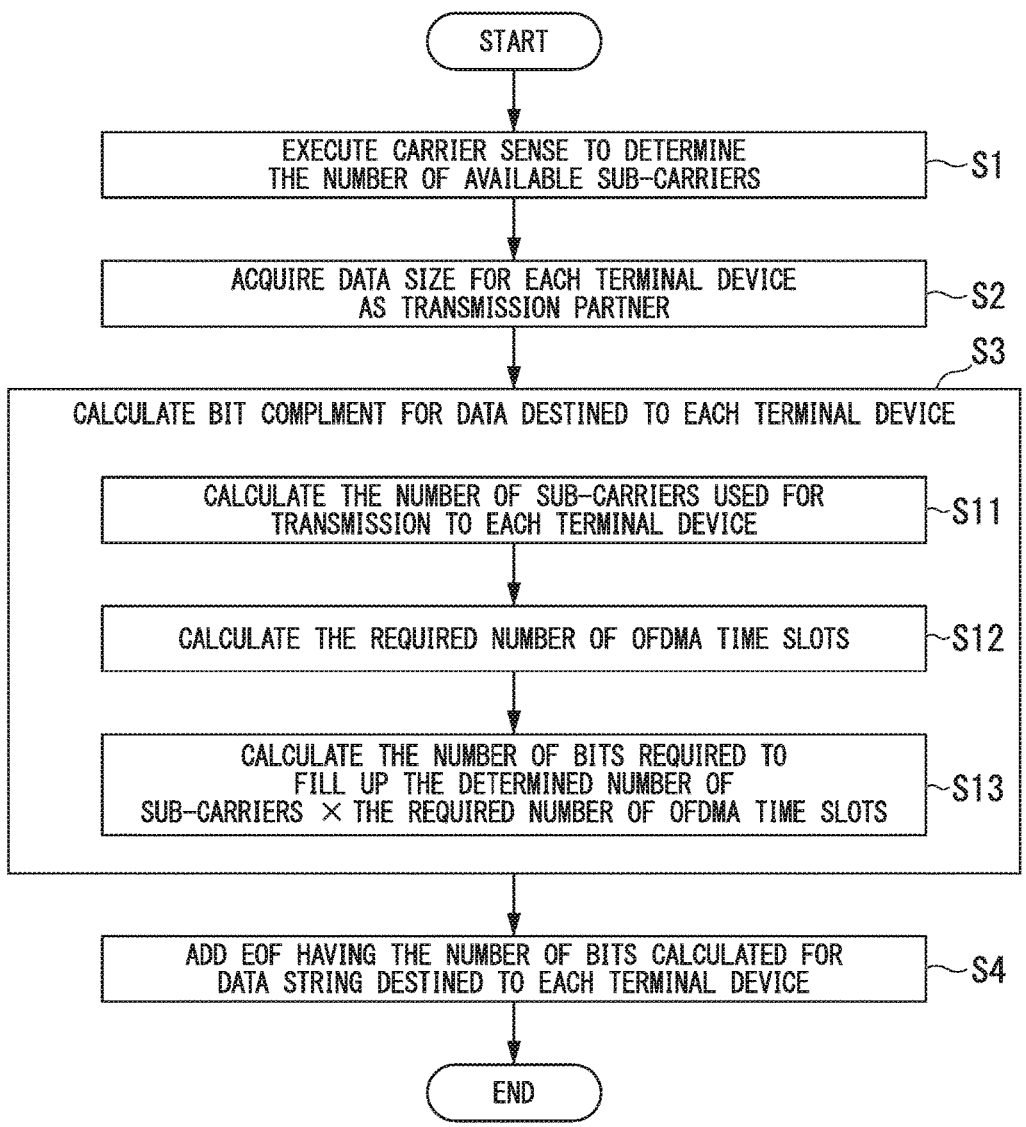
FIG. 2 is a flowchart showing an example of a data complementation procedure executed by a base station device.

FIG. 2 is a flowchart showing an example of a data complementation procedure executed by the base station device 1. The following description refers to steps S1 through S4 executed by the base station device 1. In this connection, the step S3 includes steps S11 through S13.

(Step S1)

First, the central controller 17 sends a carrier-sense instruction to the radio transmitter/receiver 15. The radio transmitter/receiver 15 executes a carrier-sense process on a candidate of radio channels used for radio transmission so as to return its result to the central controller 17. The central controller 17 determines the number of available subcarriers based on the result of carrier sense. Herein, a subcarrier refers to multiple subcarrier waves forming a sub-channel. Subcarriers do not interfere with each other even when they adjoin on the frequency axis since subcarriers are orthogonal to each other.

Specifically, in a carrier-sense process, the radio transmitter/receiver 15 receives ambient radio waves via the antenna 21 so as to identify unused but available sub-channels. As the result of carrier sense, the radio transmitter/receiver 15 notifies the identified result of available subcarriers to the central controller 15.

Figure 3:
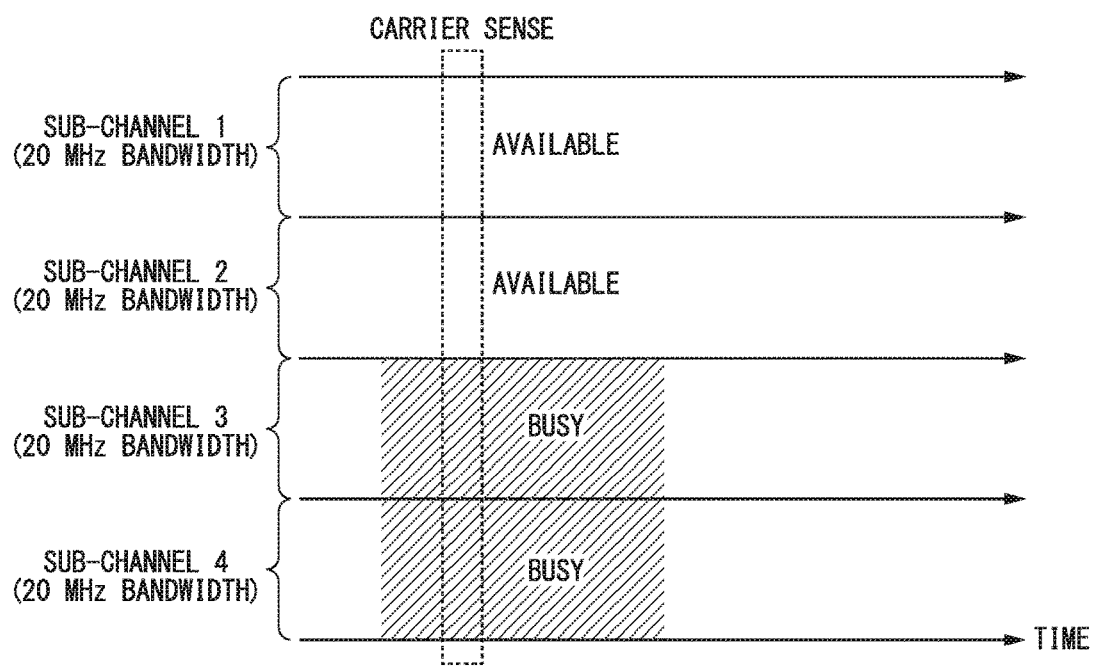
FIG. 3 shows an example of the result of a carrier-sense process on multiple sub-channels.

FIG. 3 shows an example of the result of the carrier-sense process on multiple sub-channels, in FIG. 3, the horizontal axis represents time while the vertical axis represent frequency. FIG. 3 shows four sub-channels (i.e. sub-channel 1-4) each having a bandwidth of 20 MHz. The radio transmitter/receiver 15 executes a carrier-sense process using a bandwidth of 80 MHz. As the result of receiving ambient radio waves via the antenna 21, the radio transmitter/receiver 15 determines that sub-channels 3, 4 are used (or busy) by other wireless terminals while sub-channels 1, 2 are not used (or available) by other wireless terminals.

The present embodiment identifies available sub-channels based on the reception status of the base station device 1; but this is not a restriction. As a variation of the present embodiment, it is possible for a wireless terminal, to which the base station device 1 may transmit OFDMA frames, to identify available (or unavailable) sub-channels thereof. In this case, a wireless terminal transmits information used to identify sub-channels to the base station device 1. The base station device 1 identifies available sub-channels based on the information transmitted by a wireless terminal. In this connection, the present embodiment determines whether or not sub-channels are available according to a protocol for a wireless LAN system, but it is possible to use other protocols.

Based on the identified result of available sub-channels notified by the radio transmitter/receiver 15, the central controller 17 deter ines the number $SC_{total}$ (where $SC_{total}$ is an integer equal to or greater than one) of available subcarriers. In this connection, the number of available subcarriers is determined based on available sub-channels and their allocations, and therefore different methods for determining the number of available subcarriers can be selected according to the wireless communication system used by the base station device 1. As the result of a carrier-sense process shown in FIG. 3, the central controller 17 determines the number $SC_{total}$ of available subcarriers as the number of subcarriers included in available sub-channels 1, 2.

(Step S2)

The data frame buffer 11 receives a MAC frame a MAC frame of a wireless LAN system) representing data transmitted to a wireless terminal from its subsequent device so as to temporarily hold it. Then, the data fame buffer 11 specifies the size (i.e. a data length $b_i$) of transmission data (i.e. temporarily held data) destined to a wireless terminal. The data frame buffer 11 notifies information representing the destination and the data length $b_i$ of transmission data to the central controller 17. For example, the subsequent device may be an interface for the Internet connected with the base station device 1. The MAC frame, i.e. transmission data destined to a wireless terminal, is provided from the subsequent device to the base station device 1.

In the present embodiment, the header of a MAC frame (i.e. a frame header) includes address information of a wireless terminal serving as a destination of transmission data. Then, the MAC frame is held by the data frame buffer 11 which may differ depending on each of address information included in the header of each MAC frame. That is, the present embodiment provides N buffers (i.e. the data frame buffers 11-1 through 11-N) affordable for N different addresses, and therefore it is possible to temporarily hold multiple MAC frames in multiple buffers in correspondence with maximally N different destinations (or addresses). In this connection, the present embodiment uses data frames as MAC frames according to wireless LAN standards; but this is not a restriction. For example, it is possible to use aggregation frames interconnecting MAC frames, or it is possible to combine MAC frames and aggregation frames.

(Step S3)

Upon receiving notification from the data frame buffer 11, the central controller 17 acquires information concerning destinations and data lengths $b_i$ of transmission data being temporarily held. In the present embodiment, the memory unit 16 stores information concerning a modulation rate $ml_i$ and a coding rate $cr_i$ used for wireless transmission to a wireless terminal served as a destination of transmission data. The central controller 17 reads the stored information from the memory unit 16.

The central controller 17 determines the number $SC_{total}$ of available subcarriers so as to send it to the bit complement calculation part 12. In addition, the central controller 17 sends to the bit complement calculation part 12 the information concerning the bit length $b_i$ of transmission data, the modulation rate $ml_i$, and the coding rate $cr_i$ with respect to a wireless terminal served as a destination of transmission data. Herein, it is possible to handle part or the entirety of the aforementioned information as paired information. For example, it is possible to handle all the information concerning each destination of transmission data (e.g. an i-order wireless terminal) as paired information. The central controller 17 sends a calculation instruction about a bit complement to the bit complement calculation part 12. In this connection, the modulation rate $ml_i$ and the coding rate $cr_i$ are determined based on the communication quality before transmitting data, but it is possible to use an arbitrary method for determining those values.

According to the calculation instruction, the bit complement calculation part 12 calculates a bit complement $bpad_i$ for a transmission frame destined to each wireless terminal based on the information provided by the central controller 17. Then, the hit complement calculation part 12 notifies the bit complement $bpad_i$ calculated for each wireless terminal to the bit complementation part 13 for each wireless terminal.

(Step S4)

Based on the bit complement $bpad_i$ notified by the bit complement calculation part 12, the bit complementation part 13 complements transmission data by adding data, having the number of bits corresponding to the bit complement $bpad_i$, to a data string of a MAC frame to be transmitted to each wireless terminal. As a data complementation method, the present embodiment uses EOF (End Of Frame), i.e. a bit string representing the end of each frame, for a portion of data having the number of bits corresponding to the bit complement $bpad_i$. That is, the present embodiment embeds each frame with EOF (i.e. padding). Upon detecting EOF, each wireless terminal determines it unnecessary to analyze data bits subsequent to EOF. In this connection, it is possible to use other bit complementation methods.

The OFDMA frame generator 14 receives a frame after complementation of transmission data destined to each wireless terminal from the bit complementation part 13 so as to modulate the frame by use of a predetermined modulation rate $ml_i$ and a predetermined coding rate $cr_i$. Then, the OFDMA frame generator 14 superimposes the modulated transmission data destined to each wireless terminal over the number of subcarriers (i.e. $SC_i$) assigned to each wireless terminal so as to generate OFDMA frames. The OFDMA frame generator 14 generates and sends OFDMA frames to the radio transmitter/receiver 15. Herein, OFDMA frames are adjusted in each data frame destined to each wireless terminal by way of complementation and then subjected to OFDMA multiplexing, and therefore the radio transmitter/receiver 15 is able to concurrently transmit multiple data frames.

The bit complement calculation part 12 or the central controller 17 notifies the number ($SC_i$) of subcarriers assigned to each wireless terminal, the modulation rate $ml_i$, and the coding rate $cr_i$ to the OFDMA frame generator 14. For example, the bit complement calculation part 12 may notify all the above values to the OFDMA frame generator 14. Alternatively, the bit complement calculation part 12 may notify the number ($SC_i$) of subcarriers to the OFDMA frame generator 14 while the central controller 17 may notify the modulation rate $ml_i$ and the coding rate $cr_i$ to the OFDMA frame generator 14.

The radio transmitter/receiver 15 receives OFDMA frames from the OFDMA frame generator 14 so as to wirelessly modulate and transmit them in the air via the antenna 21. The central controller 17 sends a transmission instruction to the radio transmitter/receiver 15 so as to control transmission timings. The present embodiment determines transmission timings according to the procedure of the wireless LAN system, but it is possible to arbitrarily determine transmission timings.

Next, the detailed process of step S3 shown in FIG. 2 (i.e. steps S11 through S13) will be described below. In step S3, the bit complement calculation part 12 calculates a bit complement $bpad_i$.

(Step S11)

The bit complement calculation part 12 calculates the number $SC_i$ of subcarriers used for transmitting data to wireless terminals. Herein, N represents the total number of wireless terminals subjected to concurrent data transmission.

First, the bit complement calculation part 12 calculates the number $SC'_i$ of subcarriers, which are assigned to each wireless terminal when multiple data destined to N wireless terminals are superimposed over the number $SC_{total}$ (i.e. the number of available subcarriers), by Equation (1). Herein, Equation (1) uses the modulation rate the coding rate $cr_i$, the data length $b_i$ of transmission data, and the number $SC_{total}$ of available subcarriers. In Equation (1), |x| represents the maximum integer below x.

[Equation 1]

$$SC'_i = \left| \frac{b_i \cdot cr_i}{ml_i} \cdot \frac{SC_{total}}{\sum_{i=1}^{N} \frac{b_i \cdot cr_i}{ml_i}} \right| \quad (1)$$

In addition, the remaining number $SC_{rest}$ of available subcarriers is calculated by Equation (2).

[Equation 2]

$$SC_{rest} = SC_{total} - \Sigma_{i=1}^{N} SC'_i \quad (2)$$

Next, the bit complement calculation part 12 calculates a value of $\{(b_i \times cr_i)/(ml_i \times SC'_i)\}$ with respect to each wireless terminal until the remaining number $SC_{rest}$ of available subcarriers becomes zero. Then, the bit complement calculation part 12 adds "1" to the number $SC'_i$ of subcarriers assigned to the wireless terminal having the maximum value among all wireless terminals so as to update $SC'_i$ while subtracting "1" from $SC_{rest}$. If two or more wireless terminals have the same value, the bit complement calculation part 12 selects any one of wireless terminals in a predetermined order or a random order.

Thus, it is possible to obtain the number $SC'_i$ of subcarriers assigned to each wireless terminal, and therefore the bit complement calculation part 12 determines $SC'_i$ as $SC_i$. Herein, $SC_i$ is the number of subcarriers assigned to transmit data to an i-th wireless terminal. As described above, multiple subcarriers are distributed and assigned to multiple wireless terminals; hence, the number of subcarriers assigned to each wireless terminal would be varied.

(Step S12)

The bit complement calculation part 12 calculates the necessary number $SL_i$ of time slots, i.e. OFDMA time slots. First, the bit complement calculation part 12 calculates a data length (i.e. the number of bits) $b_{i-After}$ after coding by Equation (3) using the data length $b_i$ of transmission data and the coding rate $cr_i$.

[Equation 3]

$$b_{i-After} = b_i \div cr_i \quad (3)$$

Next, the bit complement calculation part 12 calculates the number $SL_i$ of OFDMA time slots (or the necessary number of time slots) required to transmit data having the data length $b_{i-After}$ after coding by Equation (4). In Equation (4), "roundup" represents a calculation for rounding up each value to ones digit. The bit complement calculation part 12 determines the maximum number $SL_{max}$ among the necessary numbers $SL_i$ of time slots for all wireless terminals.

[Equation 4]

$$SL_i = \text{roundup}\{b_{i-After} \div (ml_i \times SC_i)\} \quad (4)$$

(Step S13)

The bit complement calculation part 12 calculates the necessary bit complement (i.e. the number of bits) $bpad_i$ required to fill up the necessary number $SL_i$ of time slots for the subcarrier $SC_i$.

First, the bit complement calculation part 12 an insufficient data length (i.e. the number of bits) $Pad_{i-Before}$ which becomes insufficient even when $(SC_i \times SL_{max} \times ml_i)$ is filled up with $b_{i-After}$ by Equation (5).

[Equation 5]

$$Pad_{i-Before} = SC_i \times SL_{max} \times ml_i - b_{i-After} \quad (5)$$

Next, the bit complement calculation part 12 multiplies the data length $Pad_{i-Before}$, which is calculated by Equation (6), by the coding rate $cr_i$ so as to produce the necessary bit complement $bpad_i$.

[Equation 6]

$$bpad_i = Pad_{i-Before} \times cr_i \quad (6)$$

Figure 4:
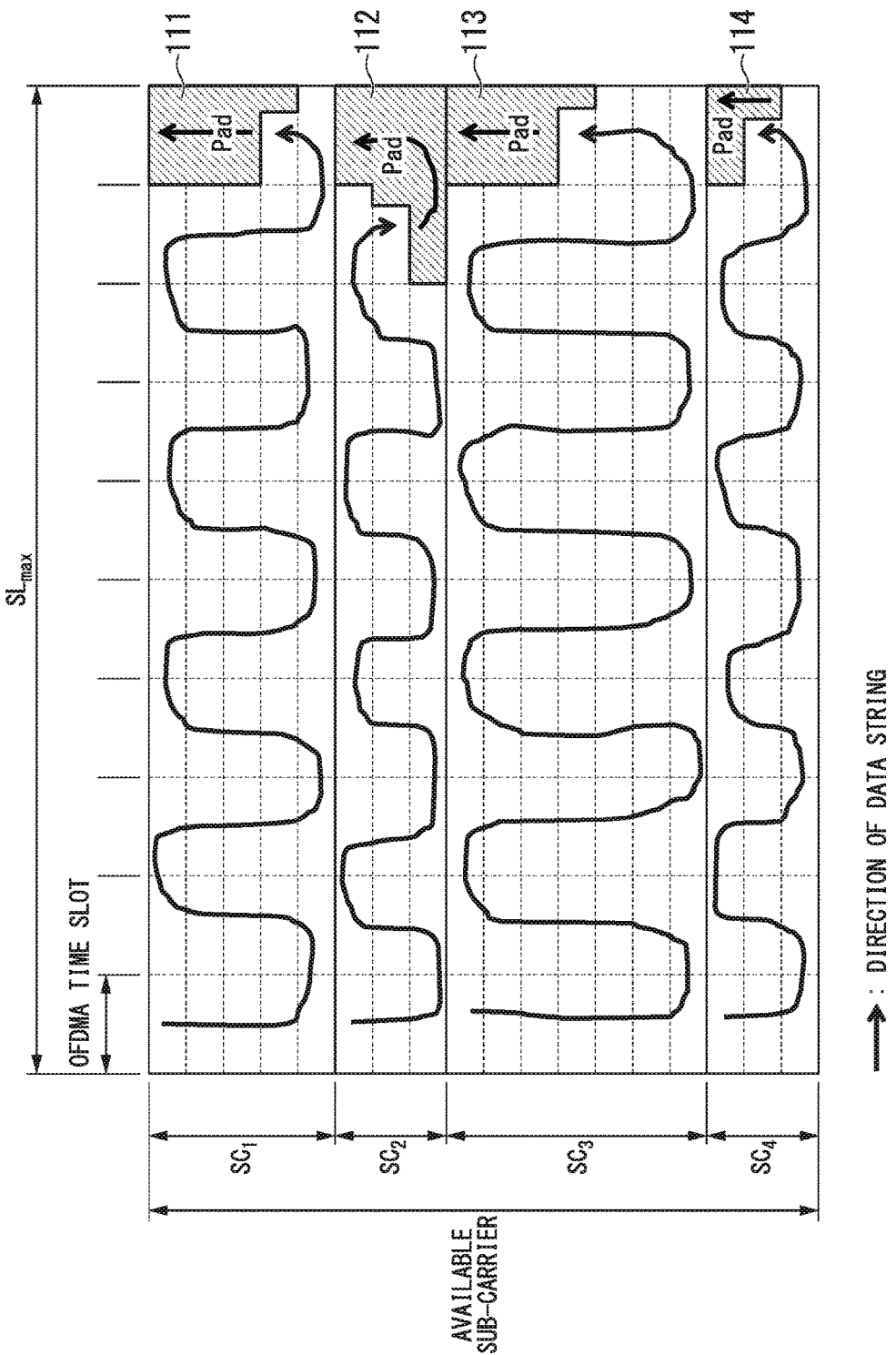
FIG. 4 shows an example of transmission data frames complemented before the execution of OFDMA modulation.

FIG. 4 shows an example of frames for transmission data subjected to complementation before the execution of OFDMA modulation, FIG. 4 shows that the number $SC_i$ of subcarriers available to the base station device 1 is eighteen while the number N of wireless terminals served as destinations of transmission data is four. Herein, $SC_1(=5)$ subcarriers are assigned to a first wireless terminal; $SC_2(=3)$ subcarriers are assigned to a second wireless terminal; $SC_3(=7)$ subcarriers are assigned to a third wireless terminal; and $SC_4(=3)$ subcarriers are assigned to a fourth wireless terminal. In addition, the necessary number $SL_{max}$ of time slots is ten.

As shown in FIG. 4, transmission data destined to wireless terminals are aligned along with subcarriers in a predetermined direction of data strings, and therefore a predetermined number of bits are used to fill up an insufficient portion of data for each subcarrier. FIG. 4 shows portions (i.e. padding portions 111 through 114) filled up with the predetermined numbers of bits. FIG. 4 shows multiple rectangles aligned with respect to available subcarriers $SC_1$ through $SC_4$, wherein each rectangle represents a symbol for each subcarrier (i.e. an OFDMA symbol). The present embodiment provides the padding portions 111 through 114 each of which is adjusted in size by use of a smaller number of bits than each symbol.

Figure 5A:
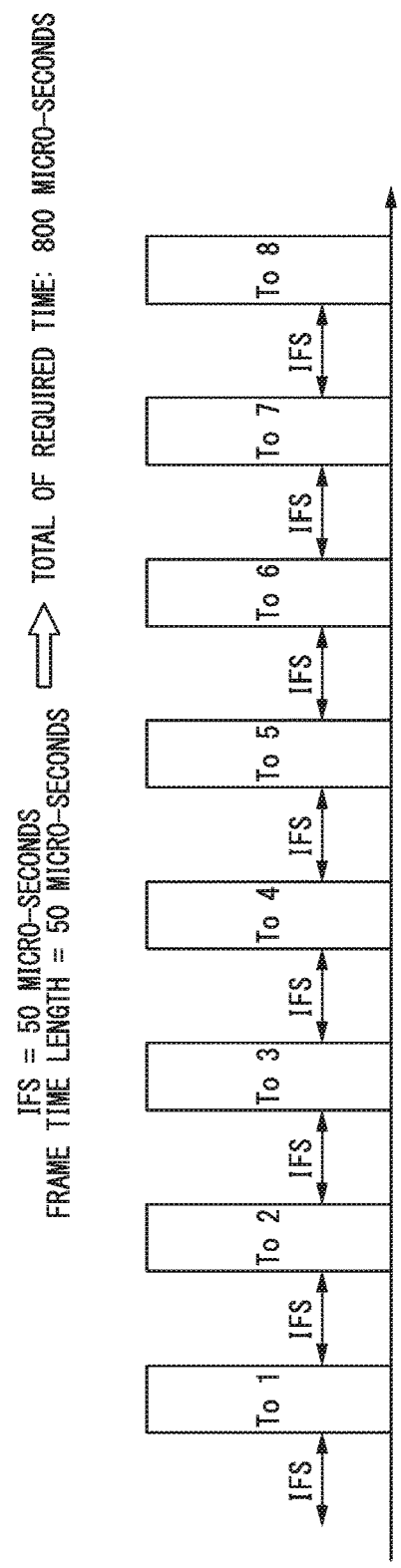
FIG. 5A shows an example of time required to transmit data according to a comparative example.
Figure 5B:
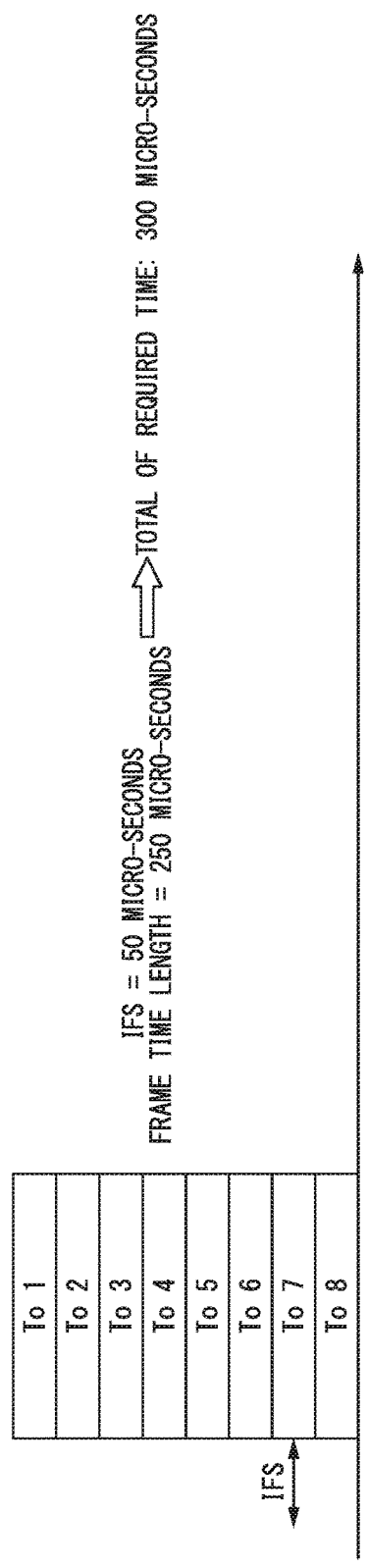
FIG. 5B shows an example of time required to transmit data according to the present embodiment.

Next, effects of the base station device 1 according to the present embodiment will be described with reference to FIGS. 5A and 5B. FIGS. 5A and 5B are made without considering the procedure for exchanging acknowledge signals (ACK) for acknowledging normal reception of transmission data at wireless terminals; hence, its illustration is omitted here.

FIG. 5A shows an example of times required for data transmission according to a comparative example. The comparative example is equivalent to a conventional technology.

Conventionally, the wireless LAN system is unable to concurrently transmit data to multiple wireless terminals without using the spatial multiplexing technology of MU-MIMO (Multi User-Multi Input Multi Output). Conventionally, the wireless LAN system achieves access control by CSMA/CA, which in turn causes overhead as the time for adjusting contention among other wireless terminals by carrier sensing, and therefore those wireless devices of the wireless LAN system may be greatly influenced by the time to wait for data transmission to other wireless terminals when transmitting data to multiple wireless terminals.

In FIG. 5A, an inter-frame contention adjusting time (IFS: Inter Frame Space) is 50 μs on average while a time length for each frame transmitted to each wireless terminal is 50 μs on average. In the case of eight wireless terminals in total, the total required time of 800 μs is needed to complete data transmission toward all the wireless terminals. In FIG. 5A, To1 through To8 indicate frames to be transmitted to first to eighth wireless terminals.

FIG. 5B shows an example of time required to achieve data transmission according to the present embodiment. In FIG. 5B, an inter-frame contention adjusting time (IFS) is 50 μs on average while a time length of each frame transmitted to each wireless terminal is 250 μs on average. In the case of eight wireless terminals in total, the total required time of 300 μs is needed to complete data transmission toward all the wireless terminals. In FIG. 5B, To1 through To8 indicate frames to be transmitted to first to eighth wireless terminals. Thus, the present embodiment is able to achieve more efficient data transmission than the comparative example.

The base station device 1 of the present embodiment is able to adjust data lengths of transmission data by way of necessary complementation for transmitting OFDMA frames. The base station device 1 of the present embodiment is able to multiplex data destined to multiple wireless terminals with the same OFDMA frame so as to concurrently transmit data to multiple wireless terminals even in cases of dynamic changes in available bandwidths, the number of wireless terminals served as destinations of transmission data, or sizes of transmission data (i.e. data lengths). In addition, the base station device 1 of the present embodiment is able to complement data with the physical layer (or the PHY layer) alone. For this reason, it is possible to improve communication efficiency in the present embodiment compared to a conventional example that can complement data in both the physical layer and the MAC layer. As described above, the base station device 1 of the present embodiment is able to efficiently complement data when transmitting data to multiple wireless terminals.

The configuration and the function of the present embodiment can be summarized as follows.

(1) A wireless communication device (e.g. the base station device 1) is designed to transmit data to multiple wireless terminals at the same timing. The wireless communication device includes a complement calculation part (e.g. the bit complement calculation part 12) that calculates the amount of complement (or a bit complement) for transmission data for each wireless terminal among multiple wireless terminals on multiple subcarriers distributed and assigned thereto, a complementation part (e.g. the bit complementation parts 13-1 through 13-N) that complements transmission data using the amount of complement calculated for each wireless terminal, and a transmitter (e.g. the radio transmitter/receiver 15) that transmits complemented transmission data to multiple wireless terminals by using multiple subcarriers.

(2) The wireless communication device further includes a frame generator (e.g. the OFDMA frame generator 14) that generates frames used to multiplex and send complemented transmission data to multiple wireless terminals.

(3) In the wireless communication device, the complementation part complements transmission data using a bit string representing the end of each frame (EOF).

(4) The wireless communication device uses MAC frames, concatenated MAC frames, or both of those frames.

(5) In the wireless communication device, the complement calculation part calculates complements for transmission data based on at least one of the number of available subcarriers, the size (or the data length) of transmission data for each wireless terminal, the modulation rate and the coding rate of transmission data.

(6) The wireless communication device further includes a controller (e.g. the central controller 17) that determines the number of available subcarriers by carrier sensing. In this connection, the present embodiment determines available subcarriers by identifying available sub-channels by carrier sensing; but this is not a restriction. For example, it is possible to directly identify available subcarriers via carrier sensing.

(7) The wireless communication device employs an OFDMA.

(8) The wireless communication device is an access point of a wireless LAN system.

(9) A wireless communication method includes a step of calculating the amount of complement for transmission data for each wireless terminal among multiple wireless terminals on multiple subcarriers distributed and assigned thereto, a step of complementing transmission data using the amount of complement calculated for each wireless terminal, and a step of sending complemented transmission data for multiple wireless terminals via multiple subcarriers at the same timing.

(10) It is possible to provide a storage medium for storing programs causing a computer to execute the aforementioned wireless communication method.

The present invention is described in detail by way of examples with reference to the accompanying drawings, however, concrete configurations are not necessarily limited to the foregoing embodiment; hence, the present invention may embrace any design changes without departing from the subject matter of the invention.

It is possible to store programs implementing the function of a wireless communication device (e.g. the base station device 1) according to the foregoing embodiment on computer-readable storage media. A computer system may achieve the foregoing function by executing programs loaded from the storage medium. Herein, the term "computer system" may embrace the operating system (OS) or hardware such as peripheral devices.

In addition, the term "computer-readable storage media" refer to flexible disks, magneto-optic disks, ROM, rewritable non-volatile memory such as flash memory, portable media such as DVD, and storage units such as hard disks installed in computer systems. Moreover, the term "computer-readable storage media" may embrace any measures for temporarily holding programs such as volatile memory DRAM) inside computer systems acting as servers or clients to which programs are transmitted through networks such as the Internet, telephone lines, and communication lines.

The above programs may be transmitted from storage media of computer systems by means of transmission media, or they may be transmitted to other computer systems by way of transmission waves propagating through transmission media. Herein, the term "transmission media" for transmitting programs refer to networks (or communication networks) such as the Internet and other media, e.g. telephone lines and communication lines, having functions to transmit information. In addition, the above programs may achieve part of the aforementioned functions. Moreover, the above programs may be so-called differential files (or differential programs) that can be combined with pre-installed programs of computer systems so as to achieve the foregoing functions.

INDUSTRIAL APPLICABILITY

The present invention aims to complement data for OFDMA frames when a base station device using a wireless LAN system transmits data to multiple wireless terminals via multiple subcarriers; but the present invention is applicable to other wireless communication systems.

REFERENCE SIGNS LIST 1 base station device
11 data frame buffer
12 bit complement calculation part
13 bit complementation part
14 OFDMA frame generator
15 radio transmitter/receiver
16 memory unit
17 central controller
21 antenna
111-115 padding portion

The invention claimed is:

1. A wireless communication device configured to wirelessly communicate with a plurality of wireless terminals using multiple subcarriers, the wireless communication device comprising:
a complement calculation part configured to calculate an amount of complement for transmission data for each wireless terminal among the plurality of wireless terminals based on a length of transmission data to the each wireless terminal, a modulation rate, and a coding rate within a number of subcarriers assigned to the each wireless terminal and a maximum number of time slots for the plurality of wireless terminals;
a complementation part configured to complement the transmission data with the amount of complement calculated for the each wireless terminal using a predetermined bit string;
a frame generator configured to generate a plurality of frames used to multiplex and transmit complemented data to the plurality of wireless terminals; and
a transmitter configured to transmit the plurality of frames to the plurality of wireless terminals.

2. The wireless communication device according to claim 1, wherein the complementation part complements the transmission data using a bit string (EOF) representing an end of the frame.

3. The wireless communication device according to claim 1, wherein the frame generator uses a MAC frame.

4. The wireless communication device according to claim 1, wherein the frame generator generates an OFDMA frame.

5. A wireless communication method adapted to a wireless communication device configured to wirelessly communicate with a plurality of wireless terminals using multiple subcarriers, the wireless communication method comprising:
calculating an amount of complement for transmission data for each wireless terminal among the plurality of wireless terminals based on a data length of transmission data to the each wireless terminal, a modulation rate, and a coding rate within a number of subcarriers assigned to the each wireless terminal and a maximum number of time slots for the plurality of wireless terminals;
complementing the transmission data with the amount of complement calculated for the each wireless terminal using a predetermined bit string;
generating a plurality of frames used to multiplex and transmit complemented data to the plurality of wireless terminals; and
transmitting the plurality of frames to the plurality of wireless terminals.

6. A non-transitory storage medium having stored therein a program causing a computer to execute the wireless communication method according to claim 5.

7. The wireless communication device according to claim 1, wherein the complement calculation part calculates a length of coded transmission data by dividing the length of transmission data for the each wireless terminal by the coding rate, calculates an insufficient data length by subtracting the length of coded transmission data from a multiplied product of the number of subcarriers, the maximum number of time slots, and the modulation rate, and thereby calculates the amount of complement by multiplying the insufficient data length and the coding rate.

8. The wireless communication method according to claim 5, wherein the amount of complement is calculated such that a length of coded transmission data is calculated by dividing the length of transmission data for the each wireless terminal by the coding rate, an insufficient data length is calculated by subtracting the length of coded transmission data from a multiplied product of the number of subcarriers, the maximum number of time slots, and the modulation rate, and thereby the amount of complement is calculated by multiplying the insufficient data length and the coding rate.

* * * * *